United States Patent [19]

Nitschke et al.

[11] Patent Number: 4,945,486
[45] Date of Patent: Jul. 31, 1990

[54] MULTI-COMPUTER SYNCHRONIZATION SYSTEM AND METHOD

[75] Inventors: Werner Nitschke, Ditzingen; Hugo Weller, Oberriexingen; Wolfgang Drobny, Besigheim

[73] Assignee: Robert Bosch GmbH, Stuttgart, Fed. Rep. of Germany

[21] Appl. No.: 402,979

[22] Filed: Sep. 1, 1989

Related U.S. Application Data

[63] Continuation of Ser. No. 107,382, Oct. 9, 1987, abandoned.

[30] Foreign Application Priority Data

Nov. 14, 1986 [DE] Fed. Rep. of Germany ....... 3638947

[51] Int. Cl.$^5$ .................. G06F 15/50; H04B 1/20
[52] U.S. Cl. .................. 364/431.11; 364/431.12; 364/551.01; 364/424.05; 364/133; 364/140; 340/825.06; 371/68.3
[58] Field of Search ............ 364/431.03, 431.04, 364/431.11, 431.12, 550, 551.01, 424, 425, 131, 133, 136–138, 140, 424.01, 424.03, 424.05; 340/52 R, 52 A, 52 B, 52 C, 52 E, 52 F, 52 H, 825, 825.02, 825.06, 825.16; 371/68.1, 68.3

[56] References Cited

U.S. PATENT DOCUMENTS

| | | | |
|---|---|---|---|
| 4,032,757 | 6/1977 | Eccles | 364/431.11 |
| 4,295,363 | 10/1981 | Buck et al. | 364/551 |
| 4,497,025 | 1/1985 | Hannoyer | 364/424 |
| 4,600,988 | 7/1986 | Tendulkar et al. | 364/131 |
| 4,731,769 | 3/1988 | Schaefer et al. | 364/424 |

Primary Examiner—Parshotam S. Lall
Assistant Examiner—Brian M. Mattson
Attorney, Agent, or Firm—Frishauf, Holtz, Goodman & Woodward

[57] ABSTRACT

To provide for continuous synchronized operation of a plurality of computer apparatus units (A, B, C) of a computer system, the respective units generate starting signals at predetermined stages in the programs. The starting signals are transmitted from any apparatus unit to any other apparatus unit, and in each apparatus unit, the time of reception of the starting signals is determined and the last-to-arrive starting signal is determined. Time marker signals are generated, and the time marker signals are transmitted from any apparatus to each other apparatus unit, to be compared in each other apparatus unit with locally generated time marker signals to thereby generate synchronizing signals. The synchronizing signals are transmitted from any apparatus unit to each other apparatus unit, compared in each apparatus unit with the time marker signals and, if a deviation between the synchronizing signals and the time marker signals which are locally generated is detected, the time instant of generation of the time marker signals of the respective apparatus is changed in a direction to null the deviation, preferably by increasing the rate of generation of the time marker signals if the synchronizing signals from other units arrive earlier than the locally generated time marker signals, so that all apparatus units will be synchronized to operate at the fastest speed of any one of the apparatus units.

14 Claims, 4 Drawing Sheets

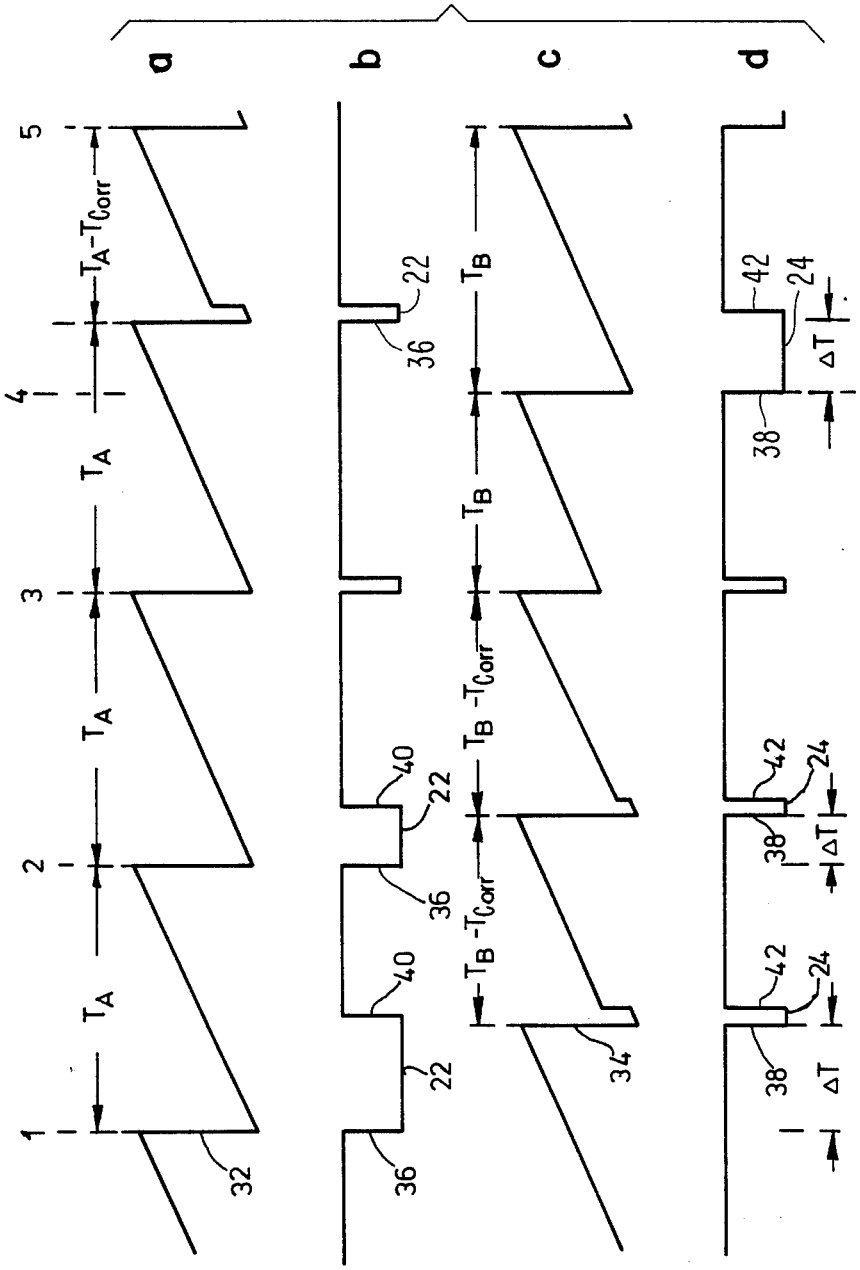

MULTI-COMPUTER SYNCHRONIZATION SYSTEM AND METHOD

This application is a continuationof application Ser. No. 07/107,382, filed Oct. 9, 1987 now abandoned.

Reference to related applications, assigned to the Assignee of the present application, the disclosures of which are hereby incorporated by reference:

U.S. Pat. No. 4,864,202 issued Sept. 5, 1989 to Werner Nitschke, Hugo Weller, Wolfgang Drobny, Peter Taufer and Edmund Jeenicke.

U.S. Pat. No. 4,853,932 issued Aug. 1, 1989 to Werner Nitschke, Hugo Weller, Wolfgang Drobny and Peter Taufer.

The present invention relates to a method and system to synchronize a plurality of computer apparatus units, and more particularly to synchronize a plurality of computer apparatus units which are used to carry out similar computation operations, to provide for redundancy in the apparatus units, especially to provide outputs for triggered safety apparatus in automotive vehicles, such as a brake antilock system, an airbag, a safety belt tensioning or tightening system or the like. The invention is applicable, in general, to all types of computer controlled operating systems in which reliability of carrying out the computer command is of utmost importance, for example for safety reasons, while reliably preventing operation of the operating element if a dangerous situation does not exist, to avoid false or erroneous operation of the operating element which, under conditions of normal functioning of other apparatus, might cause dangerous conditions to arise.

BACKGROUND

Multi-unit computer apparatus frequently employ individual computers, or computer sub-systems, which may be microcomputers or the like, in which the individual computer apparatus units provide time marker signals. The individual computer units are connected by data lines and/or control lines.

Computer units are used frequently for rapid processing of substantial quantities of data in the shortest possible time. Such computer-monitored data are frequently used for controlling and monitoring processes in various fields of technology or to derive a group of data or the results of processing of a group of data from a substantial file or data inputs. To provide for reliability, a plurality of computer apparatus units are connected to carry out a common task and to permit data exchange between the respective computer apparatus units.

One field of application for multiple computer apparatus units is the control of safety systems in automotive vehicles, such as brake antilock systems or passive passenger restraint systems, such as airbags or seat belt restraint and locking systems. Other fields of application are control of ignition, fuel injection, and complex navigation systems. The requirement for processing a substantial quantity of data, which may be processed either in a redundant mode, or independently, to permit increased data handling capability arises, for example, in a passive passenger restraint system, since the signals derived from impact sensors are a curve which includes maxima and minima, usually referred to as a crash curve. The trigger time to fire, for example, a gas cartridge or an airbag, must be precisely determined, for example, by experiments. Similarly, the operating time of a passive restraint system, such as a seat belt tightening or tensioning system, must be determined.

In impact safety systems, it is of utmost importance that data are processed as rapidly as possible since the processed data must trigger the passenger restraint system rapidly after sensing an impact. This very short period of time requires analysis of the crash curve in minimum time, and thus, processing of a multiple of data rapidly.

Well-known arrangements to control multi-computer apparatus systems are not always sufficient when the system is to control safety equipment. This can be demonstrated as an example using a passive passenger restraint system in an automotive vehicle, for instance, an airbag.

In an airbag passenger restraint system, passengers are to be protected against collision with interior components of the vehicle upon collision of the vehicle with an obstruction, which may be another vehicle. Airbags are triggered in that, shortly after the vehicle experiences a collision, an electrically ignited gas cartridge emits gas into the airbag so rapidly that an air cushion is placed between the passengers and the interior components of the vehicle.

Airbag protective systems, or other systems, are triggered by continuously sensing acceleration and deceleration of the vehicle and processing the sensed information. When the vehicle encounters an obstruction, these values are represented by the crash curve. The triggered instant for the gas cartridge, or for locking a belt restraint system, or for operation of some other system then must occur at the precise instant of time which can be determimed by experiments. The requirement of reliable response of the restraint system is, however, equally as important as the reliable protection against erroneous or inadvertent triggering. Otherwise, if an airbag would suddenly explode under normal operation, the visibility of the roadway for driving would be impaired. The surprise presence of the airbag might, additionally, cause the driver to react such that an accident might occur merely because the gas bag or restraint system has operated without any reason therefor.

Multi-unit computer systems, as frequently used, are not always capable of preventing erroneous triggering. In the same instant in which, in case of malfunction, an erroneous triggering would be indicated, it would be too late to prevent firing of the gas cartridge. It would have been irreversibly fired, and the gas filling of the airbag could no longer be prevented.

The foregoing is merely an example; there are many instances also in the field of machine tools and the like, chemical and other processes which are not concerned with safety as such, where a malfunction, which simulates, or indicates a specific condition, could cause extensive damage.

Multi-unit computer systems operate either asynchronously or are synchronized by external synchronizing or monitoring systems. If the system operates asynchronously, data necessary for data exchange between the various computer units or system components are stored in a buffer memory of the computer, also referred to as a "mailbox", in which they are retained until the computer has finished its then operating computation cycle and has found time to evaluate the data which are stored in the mailbox. This arrangement may, however, result in substantial delay in exchange of data between the computer units or components.

When using external synchronization circuits, additional circuit components are required, resulting in increased space requirements which makes application of a multi-component computer system difficult or impossible under some conditions, which are particularly bothersome in case of automotive applications where space for any control equipment is at a premium.

THE INVENTION

It is an object to provide a method and apparatus and system to synchronize a plurality of computer apparatus units in which data exchange between the respective units can be carried out at predetermined time instants, so that the overall data processing is accelerated; and, or, at the same time, to scan input signals and facilitate mutual supervision of the units without, however, requiring generation of external synchronizing signals.

Briefly, in each apparatus unit, start signals are generated at predetermined stages in the program. The start signals are transmitted from any apparatus unit to each other apparatus unit. Each apparatus unit compares the time of reception of the start signals and determines the arrival instant of the last-to-arrive start signal. A time period is calculated and a time marker signal is then generated, and the time marker signal is transmitted from any apparatus unit to each of the other apparatus units. In each of the other apparatus units, the time of reception of the time marker signals are compared with each other, and the arrival instant is determined and is used to generate synchronizing signals. The synchronizing signals are transmitted from any apparatus unit to any other apparatus unit and compared, in each of the apparatus units with the synchronizing signals and the time marker signals of the respective apparatus unit. In this comparison, if the deviation between the synchronizing signals and the time marker signals in the respective apparatus unit is other than zero, that is, if a deviation is detected, the time instant of generating the time marker signals in the respective apparatus unit is changed.

The foregoing arrangement permits re-synchronization of the multiple apparatus units at frequent intervals and, thus, in effect, permits processing a plurality of data in the respective units.

Synchronization is carried out under stationary conditions by generating the synchronizing signals in dependence upon the time markers which are generated by the respective computer unit. This arrangement permits use of circuit components which are required for data processing anyway. Each computer unit or apparatus unit, based on the received synchronizing signals, thus is capable to match its own time marker sequence to the overall system, so that no particularly high requirements must be placed on the precision of the time basis of any one of the apparatus units. Synchronized operation of the apparatus units, however, is obtained and thus permits data exchange at predetermined fixed time intervals—also termed "time windows." This arrangement then ensures that the data can be immediately processed, and thus a large quantity of data can be analyzed within the same time interval or time unit.

The method and system has the additional advantage that synchronized operation between the respective computer or apparatus units can be obtained after first connecting the units or after a RESET operation, for example due to interference, stray noise pulses, or intermittent malfunction, or due to disturbances or interruptions. Starting or restarting of a plurality of computers upon occurrence of such an event will hardly ever occur precisely at the same time instant, but usually with some time delay, more or less. Thus, synchronized operation of a plurality of data processing apparatus units is not ordinarily ensured upon starting or restarting the units.

If each apparatus unit were to be immediately synchronized, synchronous operation would be automatically obtained after some initial transient interval by suitable control of the operation. In the meanwhile, however, mutual exchange of data would not be possible. This period of time may, however, become critical if the computer units have to be reset after having carried out some computation cycles already, the resetting being due to a short disturbance pulse, for example; and if just in that phase, the processing of a substantial quantity of data is required. Since the starting signal of the last-to-start apparatus unit is used as a criterion for generation of the time markers, and thus of the synchronizing pulses, the method and system of the present invention ensures that the synchronous operation of the units will occur at the earliest possible instant of time without requiring any particular starting transient conditions.

It is also possible that synchronization of computer units can be rapidly carried out under stationary conditions by using the method and system of the present invention. This is obtained by a continuous comparison of the received synchronizing signals with the time marker signals generated by the respective computer units themselves. The degree of deviation is quantitatively determined, and thus, the possibility obtains to effect correction of the time marker sequence by a value which corresponds to the temporal shift. If the temporal shift is not excessively long, synchronization can be obtained possibly within the next succeeding cycle or period of the time marker sequence, that is, in the time interval between two sequential time markers. If the temporal shift is to inhibit a data exchange, data exchange can be carried out during the subsequent intervals of the time marker sequence.

In accordance with a feature of the invention, each one of the computer apparatus units include controllable time marker generators; the computer units, as such, can also function as synchronizing signal generators and because of the inherent circuitry thereof, can provide control and comparison functions by suitable control and comparison circuits. Thus, synchronization of the computer units can be carried out among themselves or with respect to an external synchronization generator. Synchronous operation of the respective units then permits the provision of time windows or slots within the programming sequence during which data exchange can be carried out, so that the data can be applied to the respective computation units for immediate processing.

The synchronization system, that is hardware and/or software, is identical in all the computer units or apparatus units. Thus, the computer or apparatus units will monitor each other without requiring any external monitoring or watchdog circuit.

From a structural point of view, elements which are already present in the computer apparatus units can be used, thereby decreasing the expense and space requirements with respect to an external synchronization generator. The arrangement, thus, permits the use of a multi-computer apparatus unit system for various purposes and permits additional applications of such a system where it was not used heretofore.

DRAWINGS

FIGS. 6a-6d show four aligned graphs to the same time scale illustrating the time marker sequence and synchronizing pulse sequences in the multi-computer unit system having two units.

DETAILED DESCRIPTION

Figure 1:
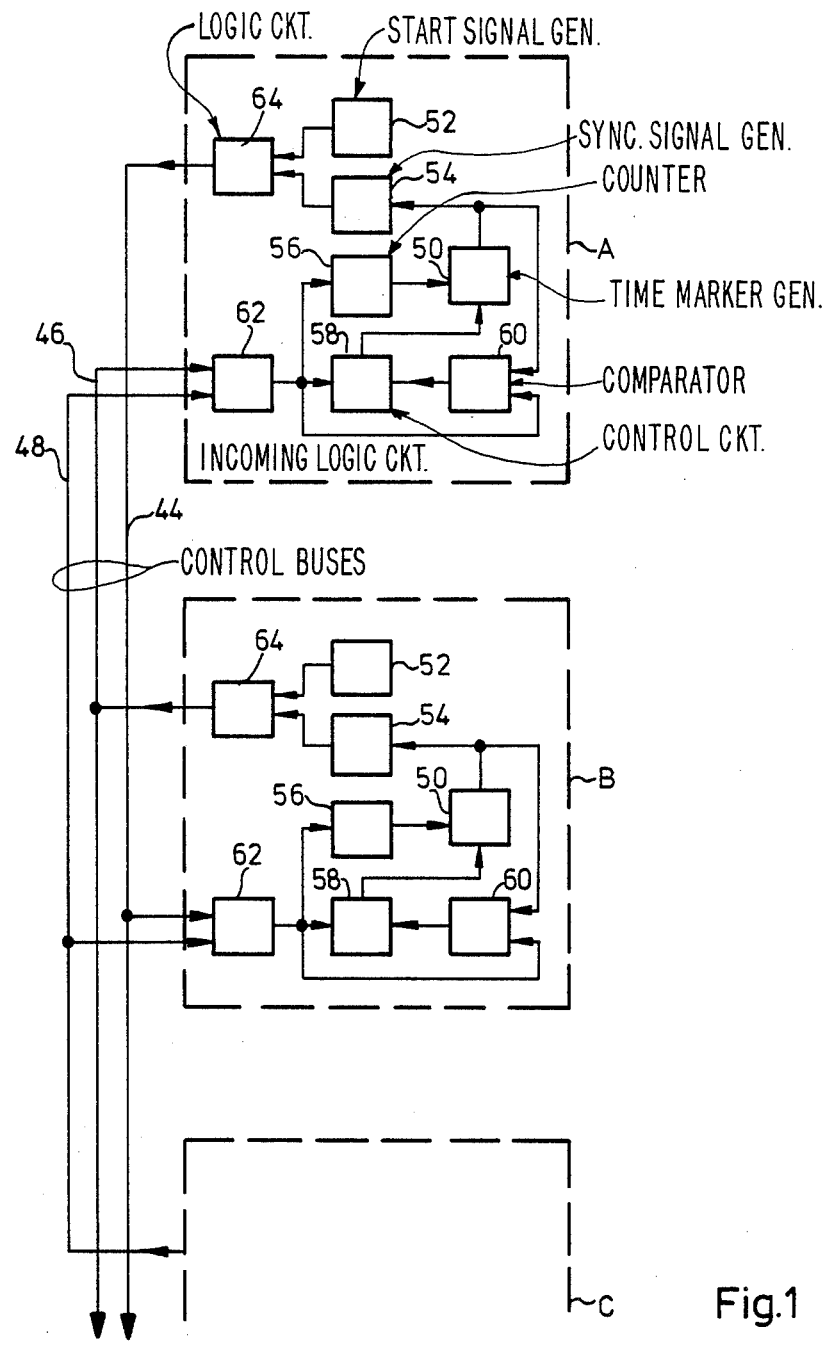
FIG. 1 is a general block circuit diagram of a multi-computer apparatus unit computer system, illustrating three computer apparatus units, and their interconnection for purposes of essentially synchronous operation.

Three computer apparatus units A, B, C of a multi-unit system are shown interconnected by control buses 44, 46, 48. The respective necessary or effective functional elements or groups, required for synchronization, are shown in the boxes outlined by the broken lines, and symbolized thereby. The blocks may represent hardware or functional groups of software, and the functions of the respective blocks may be obtained, for example, by suitable programs in the respective computer units A, B, C . . . .

The functional operating blocks in the respective units A, B, C are identical. For this reason, the block C is not shown in detail since it is merely a multiplication of what will be described in detail in connection with blocks A, B.

Let it be assumed, first, that the units of the multi-computer unit system have just been energized or have been reset. After each one of the units A, B, C has started, the start signal generator 52 generates in each one of the units a start signal. The start signals are applied via a logic circuit or logic stage 64 to the inputs of the other computer units. When received by the other computer units, they are applied to an incoming logic circuit or logic stage 62 and then to a counter 56. As well known, the computers may not start at precisely the same instance, for example, due to tolerances of components, differences in signal coursing time, random switching states, and the like. Thus, the respective start signals will arrive at the different computer units at different time intervals. The start signals, therefore, are separately monitored in each computer unit A, B, C. Monitoring can be obtained by counting of the start signals. After as many start signals have been counted as there are computer units, the last to arrive start signal causes energization or starting of a time marker generator 50. The time marker generator 50 generates time markers which control a synchronizing signal generator 54. The synchronizing or sync signals are applied also to the respective logic circuit 64 for application on the respective control lines 44, 46 and 48, and from there, to the control inputs connected to the incoming logic circuit 62 of the other computer units.

When the synchronizing pulses, applied to the incoming logic circuit 62 of the respective units A, B, C are received, they are transmitted to a comparator 60. Comparator 60 compares the synchronizing pulses or signals with the time marker signals which are generated in the respective computer unit by the time marker generator 50. If there is a time difference, a control signal is provided by comparator 60 and connected to a control circuit 58 which is connected and controls the time marker generator 50 to change the temporal sequence of the generation of the time markers.

The time marker generator 50 also controls the internal timing of the course of the programs carried out within the computer units A, B, C and is corrected in such a manner that the time marker sequence between the units A, B, C is again brought into synchronism.

As can be seen, the functional blocks of the units A, B, C are all identical. This ensures that each one of the units is capable of carrying out a change of its own sequencing of the time markers, and thus individually adapt with or synchronize with the other computer units.

Figure 2:
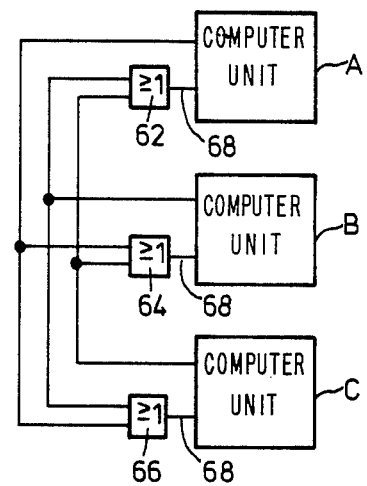
FIGS. 2 and 3 illustrate different arrangements for interconnection of the respective apparatus units.

FIG. 1 illustrates an arrangement in which separate control buses or control lines are provided between the outputs and inputs of the respective units A, B, C, as illustrated by lines 44, 46, 48. FIG. 2 illustrates a modification, in which external steering logic circuits 62, 64, 66 are provided, by use of which the number of control lines applied to the respective inputs can be reduced to a single control line 68.

Figure 3:
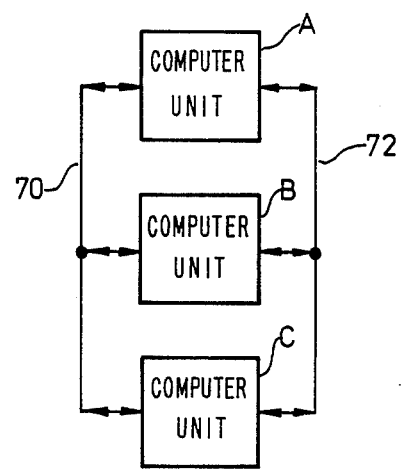

Further reduction in the number of control lines can be obtained by using the system illustrated in FIG. 3 in which the lines 70 are bi-directional lines. Data interchange is carried out by bi-directional data lines or buses 72.

OPERATION AND METHOD OF SYNCHRONIZATION WITH REFERENCE TO FIGS. 4 AND 5

Starting and synchronizing of operation of the respective units A, B is illustrated by reference to FIGS. 4 and 5. The graphic representations show the signal course of the respective starting signals and of the synchronizing signals of the units A, B, C. The turn-on or reset instant is deemed to be the ordinate or time-zero instant.

Let it be assumed that the unit A generates the first starting signal. As shown in FIG. 4, computer A thus provides a pulse-type start signal 10. Next, computer B provides a pulse start signal 12. In the example selected, computer unit C is the slowest and follows with a start signal pulse 14. In the example, three units A, B, C are used, and unit C is the slowest, and thus when pulse 14 is derived, the generation of synchronizing pulses can begin. Determination of which one of the pulses is the last can be done in accordance with well-known arrangements, for example by causing each pulse to control starting of a generator which, if a subsequent pulse is received, resets the generator to an initial or start condition; if no further pulse is received, the last one has been identified.

For better understanding, the first synchronizing pulse has been omitted. After a first and each subsequent time marker interval has elapsed, synchronizing pulses 22, 24, 26 are generated and transmitted to the remaining other units. They will be received, essentially synchronously, by all the units. To provide a precise time definition, from which the time markers are generated, it is desirable to utilize one of the flanks or sides of the start signals, and in the example selected, the leading flank 28 of the start signal 14 is so used.

Figure 5:
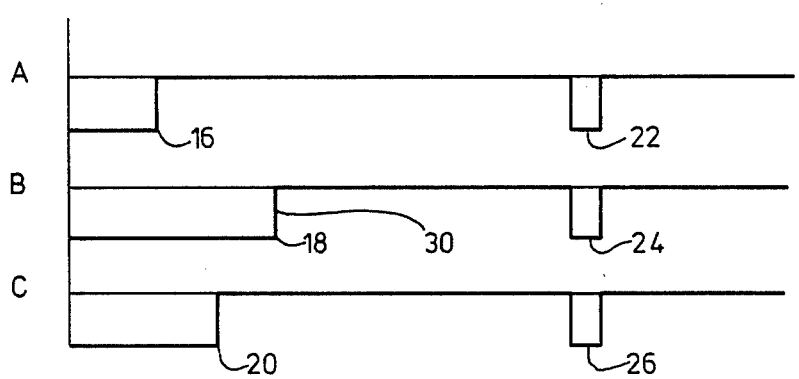

FIG. 5 illustrates basically the same system with a different type of starting pulse, however. Rather than a single pulse form start signal, static starting signals 16, 18, 20 are used. The starting time instant is the voltage jump of the start signal 18, that is, the flank 30 and in the example illustrated in FIG. 5, the computer unit B is the slowest.

After starting, it is only necessary to ensure that synchronous operation of the respective units is maintained and to correct any possible deviation. The method to maintain synchronous operation, and if necessary, effect correction is best illustrated with reference to FIG. 6.

FIG. 6 is drawn highly exaggerated, and for ease of analysis, shown only with respect to two computer units. The exaggerated illustration of FIG. 6 renders the operating method clearer.

FIG. 6(a) illustrates generation and the course of the time marker of unit A, and FIG. 6(b) the synchronizing pulses thereof. FIGS. 6(c) and (d) show the temporal course of the time markers and synchronizing pulses of the computer unit B.

A uniform time scale is assumed for the two units A and B. Reference will be made to time instants, which follow each other at a uniform rate, for example at a clock rate, shown as time instants 1, 2, . . . 5, . . . , shown on the top of FIG. 6(a).

As illustrated in FIGS. 6(a)-(d), a substantial disturbance in synchronization occurs at the time instant 1 between the units A and B. FIGS. 6(a)-(d) clearly show that the time marker 34 of the unit D is temporally shifted by a time difference $\Delta T$ with respect to the time marker 32 of the unit A. The time shift $\Delta T$ is shown below FIG. 6(d).

Figure 4:
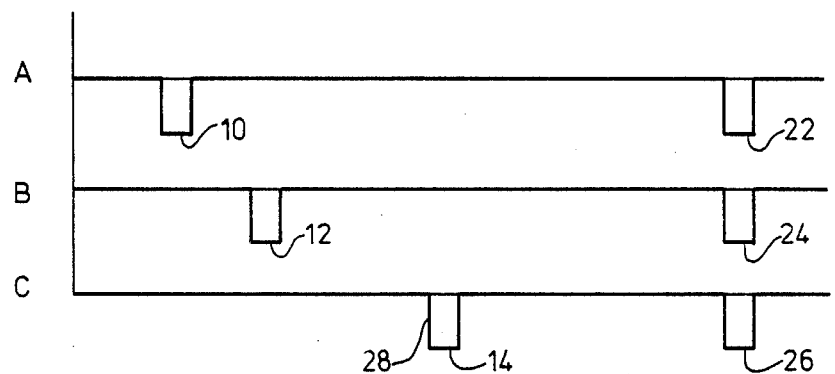
FIGS. 4 and 5 illustrate the temporal course of starting and synchronizing signals, as used in the present invention.

Starting at time instant 1, computer A generates the time marker 32 which, based on the first flank 36, causes generation of a synchronizing pulse 22 (FIGS. 4, 5). Computer unit B receives the first flank 36 of the synchronizing pulse 22, and waits for its own time marker 34 (FIG. 6(c)). As soon as the marker 34 is received, it generates its first flank 38 of synchronizing pulse 24 (FIG. 4). This first flank 38, in turn, is transmitted to the unit A and there generates a second flank 40 of the synchronizing pulse 22. The time marker sequence intervals of the time marker generator 50 of unit B is then accelerated by advancing the trigger time instant of the subsequent time marker in computer unit B. When this control step is terminated, based on the operation of the control circuit 58 (FIG. 1), the computer B generates the second flank 42 of its synchronizing pulse 24.

This sequence or cycle already contributed to approach of operation of the two units A and B towards each other compare the first two time differences $\Delta T$. The illustration, as noted above, of FIGS. 6(a)-(d) is highly exaggerated and would not normally occur in actual practice. In accordance with the illustration, however, complete synchronous operation has not yet been obtained. Thus, at the time instant 2, the computer unit A generates its time marker 32 earlier than the unit B.

As described above with reference to the time instant 1, the time marker sequence or interval of the unit B is again or still changed by the control circuit or stage 58, controlling the time marker generator 50 (FIG. 1).

As clearly appears from FIG. 6, the period or time interval $T_B$ of the marker generator of the unit B is decreased by an interval $T_{corr}$. If the shift $\Delta T$ can be long, it may occur that the possible correction interval $T_{corr}$ is smaller than the time shift $\Delta T$. In such a case, no synchronization is obtainable during the first time interval and two cycles may be necessary. Yet, and this is usually the case, the maximum value of the correctable or correction interval $T_{corr}$ is longer than the possibly expected time shift $\Delta T$, so that synchronization of the units can be obtained with one such interval between time instants 1 and 2. This condition is illustrated in the interval between time instants 2 and 3. At the time instant 3, the time markers 32 and 34 occur synchronously, that is, at the same time instant. No correction is necessary, and then, the second or trailing flank 40 of the synchronizing pulse 22 from unit A follows shortly after the flank 36.

In the example selected, synchronized operation is again disturbed, and this time the unit B receives the time marker first. It generates the first flank 38 of its synchronizing pulse 24, as before. The unit A receives this first flank 38 and waits until it generates its own time marker pulse 22. When it has received its marker pulse, it generates the first flank 36, which is received by the unit B. When unit B receives the flank 36, it generates the flank 42 of its synchronizing pulse 24. As can be seen, a time difference $\Delta T$ again arises.

Unit A now corrects its time marker sequence by control of the control circuit 58 controlling the time marker generator 50—FIG. 1—to then generate a second flank 40 of its synchronizing pulse 22. The interval $T_A$ of the period of the time marker generator 50 of the unit A is then decreased by the correction interval $T_{corr}$, as seen in FIG. 6(a). The subsequent time marker, at time instant 5 again has synchronized the units A and B, as can be seen by the simultaneous occurrence of the markers 32, 34.

Transmission of the synchronizing signal from each one of the computer units A, B, C to each one of the other units, providing for complete interconnection, has the advantage of mutual supervision of function as well as of synchronization. Any disturbances due to synchronization errors can be quickly recognized, and much faster analysis of the data which are being processed by the respective units. This, also, permits rapid initiation of counter-measures, thereby substantially increasing the operating reliability of a multi-unit system.

In accordance with a feature of the invention, the sequence of time markers can be uniformly accelerated or delayed in all the units. If this is done, the synchronization of the computers can be quickly brought to a stationary state, so that changes in time marker generation by the respective units in different directions—in some acceleration, in others deceleration—will not lead to oscillatory conditions.

The starting signal can be generated either in form of a pulse or by a static change in condition or parameter, for example, by a static voltage level change. The flank of the pulse shape or static change-of-state signal is then evaluated to form the starting signal. In this manner, the starting time instant can be precisely determined, which increases the reliability of synchronization of the respective computer units at the beginning of synchronization.

In accordance with a feature of the invention, the synchronizing signals are represented by pulse-type changes in state, for example, voltage changes. It is desirable that each unit generates a synchronizing pulse having a sharp flank, which can be readily analyzed, so that the synchronizing pulse flank is generated and transmitted to the other units. Generation of the time marker, with the signal or pulse, is carried out by the time marker generator 50 (FIG. 1). Generating the time markers with a precise flank then affects the subsequent synchronizing pulses which, likewise, can be analyzed with respect to flanks similarly to the analysis of the start signals to provide for initial synchronization of the units at the beginning of the synchronization cycle or program.

Associating respective flanks or sides of the signal waves with specific synchronization events permits simple and precise quantitative determination of time shift between the flank of the synchronization pulse and the respective flank of the locally generated time marker in case there is a deviation in synchronization between the respective units. This, again, contributes to rapid and precise re-establishment of synchronized operation in case such a deviation has been detected.

In accordance with a preferred embodiment, the temporal shift $\Delta T$ between the respective flank of the respective first synchronization pulses and the locally generated time marker is compared, after that respective flank of the synchronization pulse has been received. In dependence on detection of a time shift, the generation of subsequent time markers in the respective units is accelerated. The method steps thus will utilize the flank of the synchronizing pulse of the fastest one of the units as a reference level. The other units must follow this fastest one of the units with the time marker sequence generated by their own time marker generators 50, so that the respective time marker signals are synchronized with the fastest one of the units. In contrast to the possible reference to the slowest one of the computer units, however, the selection of the fastest one as the reference contributes to increased computation speed of the system as a whole.

Preferably, the time marker sequence is accelerated by premature triggering of the next time marker to be generated in the respective unit. Influencing the time marker sequence in that matter can be readily instrumented in the usual time marker generators and provides for correction of the sequence within the time interval between two sequential time markers.

In a practical embodiment of the invention, all computers generate a second flank of their synchronizing pulses after receipt of the first flank of the respectively last synchronizing pulse. This feature, thus, can be used for mutual supervision of the units by utilizing the return flank or jump of the signal level of the synchronizing pulses, to thereby form an "acknowledge" signal, suitable for the mutual supervision of the units.

If one or more synchronizing signals deviate from an average time clock by more than a predetermined interval, it is easily possible to reset all of the units at the same time by merely carrying out comparison of the arrival of the synchronizing signals from a clocking interval and generating a reset signal if more than a predetermined deviation is detected.

The extent of the correction interval or time $T_{corr}$ is limited. It may thus occur that, due to such limitation, synchronization would occur only after several cycles. By comparing the synchronizing pulses with a fixed clock, the possibility arises to increase the speed with which synchronization can be obtained by resetting the respective unit or units which has or have a substantial variation from the clock. This system or method also senses synchronization errors due to disturbances which could, besides interfering with synchronization, also affect the internal programming steps or program course of the respective unit or units.

In accordance with a feature of the invention, the respective computer or apparatus units have their own controlled time marker generator 50 and their own individual comparators 60 and control circuits 58, connected as described in connection with FIG. 1. Of course, an overall or general synchronization generator—not shown in FIG. 1—and connected as is customary in computer apparatus, may also be used, for external synchronization. The automatic or adaptive synchronization of the respective units A, B, C then easily permits the provision of time windows within the program course, during which time windows a data exchange can be carried out. Such data exchange, as programmed or controlled, is well known in connection with multi-unit systems and permits data which are exchanged to be immediately processed.

In accordance with a feature of the invention, the time marker generators 50 are sawtooth wave generators—see waveforms shown in FIGS. 6(a) and (c). The signals derived from sawtooth wave generators provide a steep flank which defines a precise time period or time marker, and by the essentially linear course in advance of the steep flank, permits accurately controlled change of the time marker sequence. Such instrumentation of the time marker generator 50 readily permits correction of the time marker sequence within one cycle of generation of the time markers with reasonable time availability for the correction time interval $T_{corr}$.

In accordance with an embodiment of the invention, steering logic circuits 62, 64, 66 (FIG. 2) are connected in advance of the synchronizing inputs of the respective units, which receive the synchronizing signals from synchronizing signal outputs of the respective other units, to provide signals on a single control line. Such steering logic units may, for example, include analysis of received signals which are coupled to multiple inputs to provide a respective output, controlling the time marker generator and the comparator. This arrangement has the advantage that all the input terminals of the respective units can be identical, with different connections, to permit connection to the different units, only being made to the respective steering logic circuits—compare connections to terminal 62 (FIG. 1) and the connections to the units 62, 64, 66 and units A, B, C of FIG. 2.

In accordance with another feature of the invention, the computer units A, B, C are connected by bi-directional control buses or control lines which, as well known in computer technology, can be formed as common connection lines operating in multiplex mode. Reduction of the number of lines or buses is a desirable goal since the physical size of the apparatus system is thereby decreased, and, very importantly, the possibility of malfunction due to connection resistances or faulty interconnections or buses is reduced.

We claim:

1. Method of synchronizing a plurality of computer apparatus units interconnected by at least one bus (44, 46, 48; 70, 72), particularly for a multi-unit computer system supervising and controlling safety apparatus, comprising the steps of:

generating a starting signal (10, 12, 14; 16, 18, 20) at predetermined stages in a program in each apparatus unit;

transmitting said starting signal from each apparatus unit (A, B, C) to each other apparatus unit;

comparing, in each apparatus unit, a time of reception of said starting signals and determining an arrival instant of a last-to-arrive starting signal (14, 18);

generating, in each apparatus unit (A, B, C), a respective time marker signal (32, 34);

transmitting said respective time marker signal from each apparatus unit to each other apparatus unit;

comparing, in each apparatus unit, a time of reception of said time marker signals and determining the arrival instant thereof and generating synchronizing signals (22, 24, 26);

transmitting said synchronizing signals from each apparatus unit to each other apparatus unit;

comparing, in each apparatus unit, said synchronizing signals with the time marker signal of the respective apparatus unit, and if a deviation between said synchronizing signals (22, 24, 26) and said time marker signal (32, 34) is detected in the respective apparatus unit, adjusting the time of generation of the time marker signal in said respective apparatus unit until the time marker signal and synchronizing signal coincide.

2. The method of claim 1, wherein each starting signal is a signal selected from the group consisting of:
a starting pulse (10, 12, 14) and
a static change-of-state of an electrical parameter (16, 18, 20).

3. The method of claim 2, wherein said starting signal is defined by an edge (28, 30) thereof.

4. The method of claim 1, wherein the synchronizing signals comprise changes of state of an electrical parameter (22, 24, 26).

5. The method of claim 1, wherein, in each apparatus unit, reception of a time marker signal (32, 34) controls generation of a time marker signal in the respective apparatus unit in such a manner that a first edge (36, 38) of the synchronizing pulse (22, 24) is generated therein and transmitted to each other apparatus unit.

6. The method of claim 5, including the step of comparing, in all apparatus units, the instant of reception of said first flank (6) of the first-to-arrive synchronizing pulse (22) with the time marker pulse (34) generated in the respective apparatus unit to determine temporal shift (ΔT) between said first flank and a corresponding flank of the respectively generated time marker signal; and the step of changing a time instant of the generation of the time marker signals within the respective apparatus unit comprises accelerating the time of generation of the time marker signals in the respective unit in dependence on the detection of said shift (ΔT).

7. The method of claim 6, wherein
the step of accelerating generation of the time marker signal (34) from the synchronizing signals comprises:
accelerating generation of said time marker signals in the respective apparatus unit.

8. The method of claim 5, wherein
the step of transmitting said synchronizing signals from an apparatus unit to each other apparatus unit comprises:

generating in all said apparatus units (A, B, C) a second edge (40, 42) of the respectively generated synchronizing pulses (22, 24) after reception of said first edge (38) of a last-to-arrive synchronizing pulse from any other apparatus unit.

9. The method of claim 1, including the steps of:
generating an average clocking sequence; and
detecting if at least one of said synchronizing signals deviates from said clocking sequence by more than a predetermined level, and, if such detection shows such deviation, resetting all said apparatus units (A, B, C).

10. A multi-computer computer system, having a plurality of computer apparatus units (A, B, C), for supervising and controlling safety apparatus,
said computer system having means for synchronizing operation of said plurality of computer apparatus units (A, B, C), and data and control buses (44, 46, 48; 70, 72) interconnecting said apparatus units, comprising in each apparatus unit:
a respective time marker generator (50);
a synchronizing signal generator (54);
a counter coupled to receive respective starting signals generated in all other apparatus units;
a control circuit (58) coupled to receive starting and synchronizing signals of all other apparatus units and having an output controlling a temporal sequence of generation of time markers by said time marker generator; and
a respective comparator (60) connected to said data and control buses (44, 46, 48; 70, 72) and to an output of said respective time marker generator (50) and comparing said synchronization signals received from the computer units and the time marker signals generated by the time marker generator (50) of a respective apparatus unit to detect any temporal shift therebetween, said comparator (60) controlling said control circuit (58) in accordance with a magnitude of said temporal shift.

11. The system of claim 10, wherein each time marker generator comprises a sawtooth wave generator (50).

12. The system of claim 10, further including steering logic circuits (62, 64, 66) coupled to receive the synchronizing and starting signals generated by, respectively, the starting signal generator (52) and the synchronizing signal generator (54) of the respective apparatus units, and transmitting said signals to a respective unit on a single control line (68).

13. The system of claim 10, wherein said control buses comprise bi-directional control buses (70).

14. The system of claim 10, wherein said data and control buses interconnect the respective apparatus units by buses (44, 46, 48; 70, 72) connected to and common to all said apparatus units (A, B, C).

* * * * *